June 21, 1927.
G. LOLLI
1,632,980
EXTENSIBLE VEHICLE FENDER
Filed Dec. 20, 1926    2 Sheets-Sheet 2
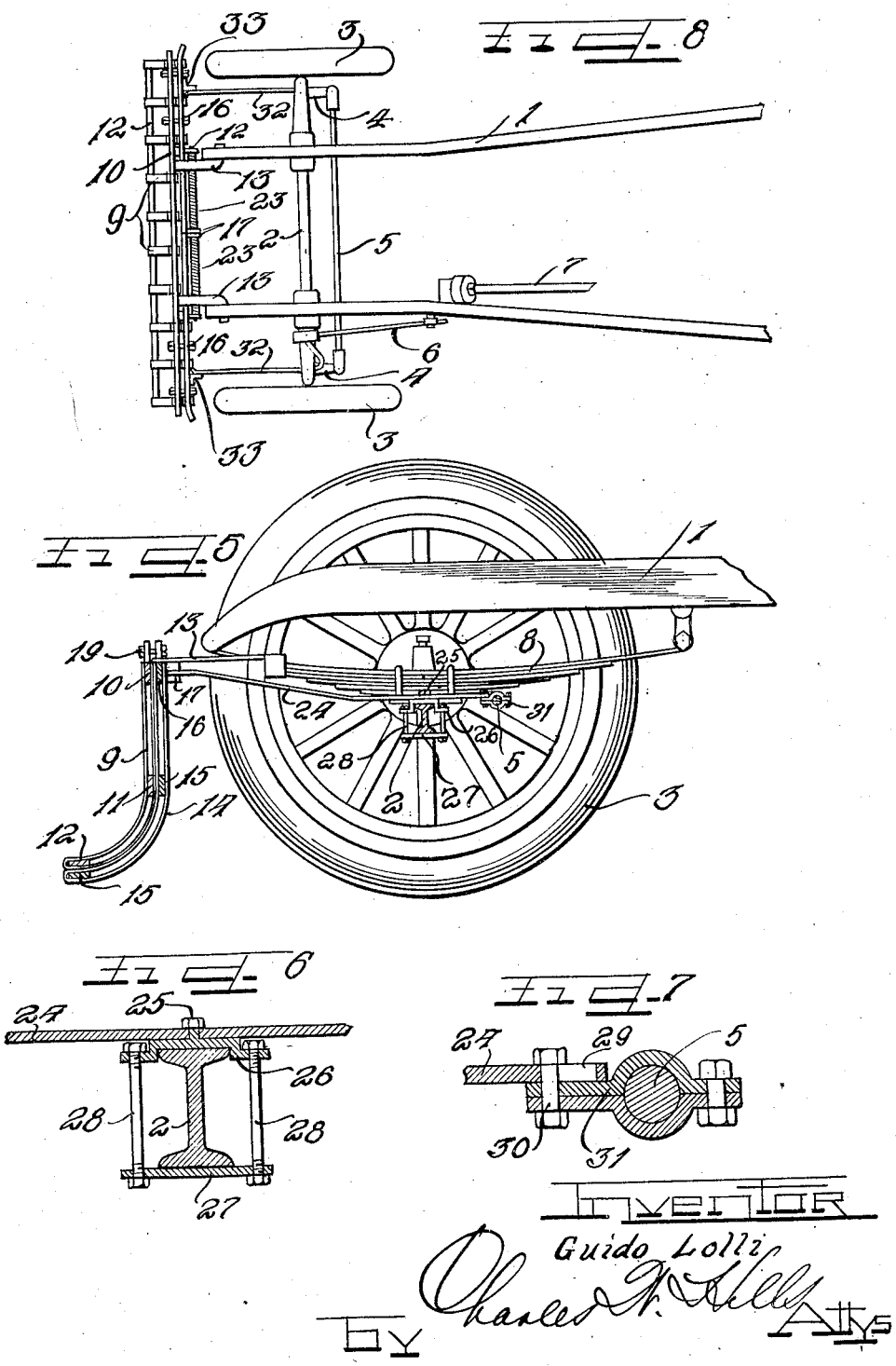

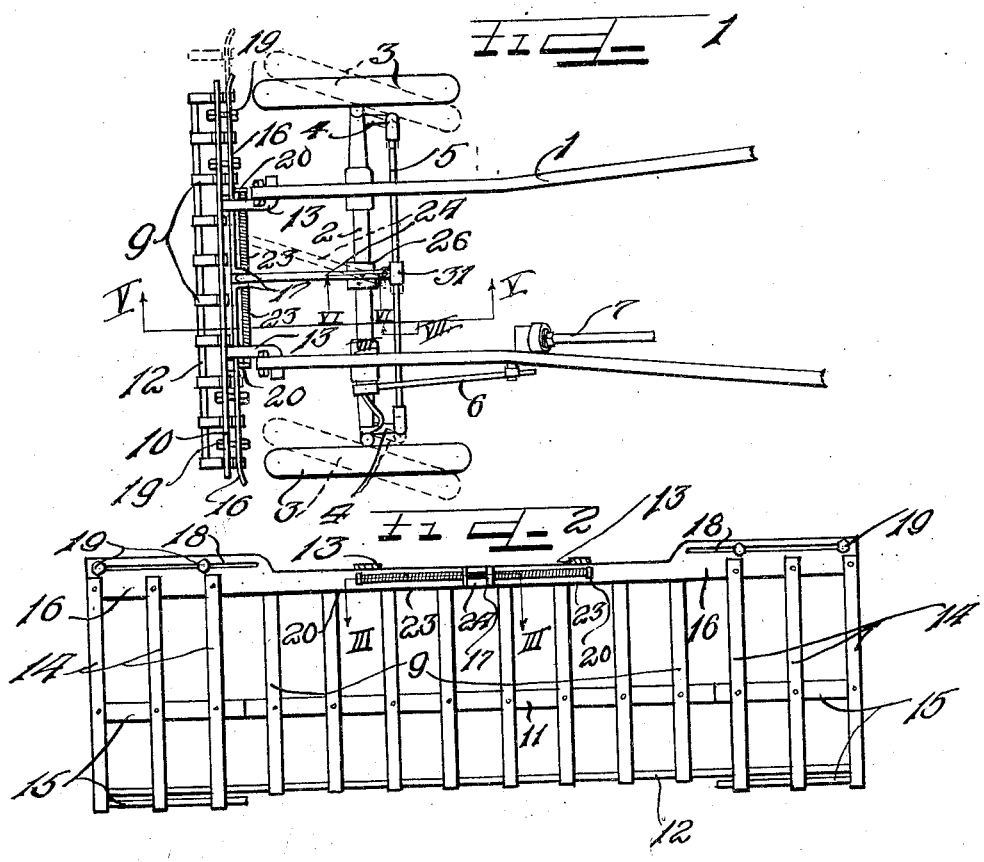
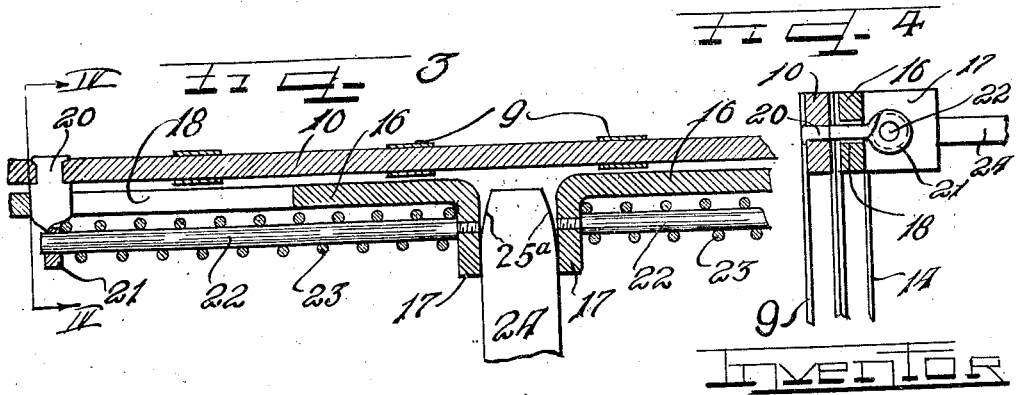

Patented June 21, 1927.

1,632,980

UNITED STATES PATENT OFFICE.

GUIDO LOLLI, OF CHICAGO, ILLINOIS.

EXTENSIBLE VEHICLE FENDER.

Application filed December 20, 1926. Serial No. 155,781.

This invention relates to a vehicle fender and more particularly to a fender adapted for use on motor trucks and the like, with said fender having extensible end members adapted to be operated automatically by the vehicle steering cross rod or tie rod to afford an arrangement whereby the fender is adapted to be extended in the direction in which the vehicle is to be turned.

It is an object of this invention to provide a motor vehicle with an extensible fender adapted to be operated from the steering tie rod of the vehicle.

It is also an object of this invention to provide a vehicle with a fender having spring controlled extensions adapted to be automatically operated by the steering mechanism of the vehicle.

It is an important object of this invention to provide a vehicle with an improved fender having spring controlled extensions which are connected with the steering tie rod of the vehicle to permit either one of the extensions to be automatically projected in front of a steering wheel depending upon the direction in which the vehicle is turned so that the fender will be extended an amount proportional to the turning of the vehicle.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary top plan view of the front end of a motor vehicle chassis equipped with an improved extensible fender embodying the principles of this invention.

Figure 2 is an enlarged rear elevation of the extensible fender removed from the vehicle.

Figure 3 is an enlarged fragmentary detail section of the fender taken on line III—III of Figure 2.

Figure 4 is an enlarged fragmentary detail section taken on line IV—IV of Figure 3.

Figure 5 is an enlarged sectional view of the front part of the vehicle chassis taken on line V—V of Figure 1.

Figure 6 is an enlarged fragmentary detail section on line VI—VI of Figure 1.

Figure 7 is an enlarged fragmentary detail section taken on line VII—VII of Figure 1.

Figure 8 is a fragmentary top plan view of the front end of a vehicle equipped with a modified form of an extensible fender.

As shown on the drawings:

The reference numeral 1 indicates an automobile truck chassis frame supporting a front axle 2 on the ends of which front steering wheels 3 are carried. The steering wheels 3 are connected by means of steering knuckles 4 to the ends of a steering cross rod or tie rod 5. The steering cross rod 5 is connected in the regular manner to a steering arm thrust rod 6 which in turn is connected to be operated from the steering column 7 of the vehicle. Supported on the front axle of the vehicle to the inside of the wheels 3 are front vehicle springs 8.

Supported upon the front springs 8 or upon any other suitable portion of the chassis across the front of the vehicle is an improved extensible fender embodying the principles of this invention. The improved fender comprises a main body portion or section embracing a plurality of curved tines or arms 9 spaced equi-distantly apart in parallel relation and rigidly held in such spaced relation by means of longitudinally disposed connecting bars 10, 11, and 12. Rigidly clamped or otherwise secured to each of the front ends of the front vehicle springs 8 is a supporting bracket or arm 13 which project forwardly and are rigidly secured to the top of the main fender section to hold the same supported in place.

Slidably mounted upon each end of the back of the main fender section is an auxiliary fender or an extension comprising a plurality of equi-distantly spaced tines or arms 14 which are curved complemental to the shapes of the main fender arms 9 and seat in back of the same, as clearly illustrated in Figure 5. The auxiliary fender arms 14 have the lower portions thereof connected by transversely disposed connecting bars or rods 15. The upper ends of the fender arms 14 of each auxiliary fender are rigidly secured to an upper brace bar or support 16 which extends inwardly to within a short distance of the middle line of the main fender section and has the inner end thereof bent rearwardly at an angle to afford a flange or arm 17. The upper supporting bar 16 is also provided with a longitudinal slot 18 through which bolts 19 project. The bolts 19 are secured to the back of the upper bar 10 of the main fender section and afford a support on which the auxiliary fender sections are adapted to slide. The upper bars 16 of the auxiliary fender sections slidably project through openings in guide arms 20 which are rigidly secured to the upper bar 10 of the main fender section and project rearwardly with the rear end of each of the guide arms 20 twisted at right angles to afford an extension 21 positioned parallel to the respective flange 17 of the upper auxiliary fender bar 16, as clearly illustrated in Figure 3. The bracket extension 21 is provided with an opening through which a guide rod 22 slidably projects. The inner end of each of the slide bars is threaded into a threaded opening in the flange 17 to hold the guide bar in position. Coiled around each of the guide bars 22 is a coiled spring 23, one end of which seats against the flange 17 while the other end seats against the bracket extension 21.

When the two auxiliary fender sections are in their normal or closed positions, as illustrated in Figure 2, the flanges 17 of the two auxiliary fender sections are spaced apart a short distance to receive the outer end of an actuating lever or arm 24 therebetween. The outer end of the actuating lever 24 has the side edges thereof curved at 25$^a$ to afford a rocking contact with the flanges 17 to permit the auxiliary fender sections to be independently projected outwardly by the action of the actuating lever 24 against the action of the control spring 23. The actuating lever 24 projects downwardly and rearwardly above the vehicle front axle 2 and is pivotally mounted intermediate its ends on a pivot pin or bolt 25 which is integrally formed or rigidly secured to the top surface of an upper clamping plate 26 which is channel-shaped to seat over the upper flange of the front axle 2, as clearly illustrated in Figure 6. Positioned below the bottom flange of the front axle 2 is a lower clamping plate 27 which is apertured and connected to the upper clamping plate 26 by clamping bolts 28 to afford a rigid support for the pivoted actuating lever 24. The rear end of the actuating lever 24 projects beyond the front axle 2 and is provided with an opening or slot 29 (Figure 7) through which an actuating bolt 30 projects. The actuating bolt is carried by a clamping bracket 31 which is securely clamped around the middle portion of the vehicle steering cross rod 5.

By referring to Figure 1 of the drawings it will be observed that the vehicle is provided with a fender comprising a substantially rigid main fender section having slidably mounted thereon spring controlled auxiliary fender sections which are adapted to be shifted outwardly, independently of one another, by the control actuating lever 24 which is adapted to be operated by the vehicle steering cross rod or tie rod 5 whenever said cross rod is operated from the steering wheel of the machine and the steering column 7 to steer the front wheels of the vehicle.

Figure 8 illustrates a modified form of the invention in which the main fender section and the auxiliary fender sections are of substantially the same construction as illustrated in Figures 1 to 7, inclusive, with the main fender section rigidly supported on the vehicle springs 8 by the brackets 13 or other suitable means. In this form of the device the single actuating lever 24 is omitted and two actuating levers or bars 32 are provided, connected with the steering knuckles 4 at the ends of the steering cross rod or tie rod 5. In this construction each of the auxiliary fender sections has an actuating lever or arm 32 associated therewith to co-act with an angle bracket 33 secured on the rear face of the upper arm 16 of the respective auxiliary fender sections. In this construction the steering cross rod 5 is adapted to be actuated from the steering column 7 to not only steer the front vehicle wheels 3, but also to operate the levers 32 to cause one of the auxiliary fender sections to be slidably projected outwardly from behind the main fender section in a direction in which the steering wheels are being turned.

The operation of the device appears to be self-evident from the drawings and the description thereof. It will be noted that when the improved extensible fender is mounted in position on the front ends of the vehicle springs 8 by means of the brackets 13 that the control springs 23 normally act to hold the auxiliary fender sections in their innermost positions hidden behind the ends of the main fender section. This of course is only true when the steering wheels are in their normal straight position parallel to the side of the chassis frame, as illustrated in full lines in Figure 1. In case it is desired to make a turn to the right around a corner or at any other place it will be noted that the steering mechanism when operated to cause the steering wheels 3 to turn to the right into the dotted lines position shown in Figure 1 that the control lever 24 connected with the middle portion of the steering cross rod 5 will be simultaneously operated to swing about its pivot point 25 into the dotted line position of Figure 1, thereby causing the outer end of the lever 24 to co-act with the flange 17 of the respective auxiliary fender section at the right hand side of the car to slide outwardly into the dotted line position, thereby compressing its respective control spring 23. Since the control lever 24 moves away from the flange 17 of the left hand auxiliary section, said auxiliary fender section remains in its normal position. In case the steering mechanism is operated to execute a left hand turn the control lever 24 will be swung towards the left to slidably move the auxiliary left hand fender section into an extended position a distance proportional to the degree of the turning of the front steering wheels. It will thus be noted that when the steering mechanism is operated to execute either a right or left hand turn that the respective auxiliary fender section will be positively projected outwardly in front of the respective steering wheels so that there is no danger of any person or object caught in the fenders to travel or be caught beneath the advancing wheels. When the steering mechanism is returned to its normal position the control springs 23 automatically act to pull the respective auxiliary fender sections back into their normal positions.

In the modified arrangement illustrated in Figure 8 the operation is substantially the same as that already described, with the exception that in this case two control levers 32 are provided, connected to be operated by the steering cross rod 5 with one of said levers associated with the right hand auxiliary fender section and the other lever coacting with the left hand auxiliary fender section. With this arrangement the operation of the steering cross rod when operated to execute a turn will automatically also operate the levers 32 so that the proper auxiliary fender section will be projected from behind the main fender section in a direction corresponding to the direction of the turning of the vehicle. This arrangement of associating the auxiliary fender sections with the vehicle steering mechanisms affords a positive and simplified arrangement for automatically positioning or operating auxiliary fender sections so that accidents are obviated when persons or articles happen to be caught in the path of advance of a turning vehicle.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a vehicle and the steering cross rod thereof, of an extensible fender mounted at the front end of the vehicle, and a fulcrumed lever coacting with the extensible fender and operable by the steering cross rod to cause the fender to be extended when the steering cross rod is actuated.

2. The combination with a vehicle and the steering cross rod thereof, of an extensible fender supported on the vehicle, and lever means operable by the steering cross rod adapted to coact with the fender to extend the same in the direction of steering of the vehicle by the operation of said steering cross rod.

3. The combination with a vehicle and the steering cross rod thereof, of a main fender section supported on the front end of the vehicle, auxiliary fender sections slidably mounted on said main fender section, and a fulcrumed lever connected with said steering cross rod and coacting with said auxiliary fender sections to coact therewith to cause one of said auxiliary sections to be extended when the steering cross rod is actuated.

4. The combination with a vehicle and the steering cross rod thereof, of a main fender supported on the vehicle, auxiliary fenders slidably mounted thereon, resilient means connected with said auxiliary fenders for holding the same in retracted position, a clamping bracket on the vehicle, and a lever pivoted on said clamping bracket with one end of the lever coacting with said auxiliary fenders and the other end of said lever connected to be actuated by the steering cross rod to cause the lever to extend one of the auxiliary fenders to the right when the vehicle is turned toward the right and the other auxiliary fender to be projected to the left when the vehicle is turned toward the left.

5. The combination with a vehicle and the steering mechanism thereof, of an extensible fender, means for supporting the same at one end of the vehicle, a lever supported on the vehicle and having one end thereof coacting with the extensible fender, and means connecting said lever to the steering mechanism to cause actuation of the lever with the operation of the steering mechanism to extend the fender in the direction in which the vehicle is being steered.

6. The combination with a vehicle and the front axle and the steering cross rod thereof, of an extensible fender mounted on the vehicle, a clamping bracket secured on said front axle, a control lever pivoted on said clamping bracket and having one end of said lever coacting with the extensible fender to operate the same, and a clamping bracket secured on the steering cross rod and pivotally connected to said lever to cause actuation of the lever with the operation of the steering cross rod to cause the extensible fender to be extended in the direction of steering of the vehicle.

7. The combination with a vehicle and the steering mechanism thereof, of a main fender mounted on the vehicle, spring controlled auxiliary fenders slidably mounted on said main fender, flanged bars secured to said auxiliary fenders, a lever pivotally supported on the vehicle with one end of the lever positioned between the flanged ends of said flanged bars, and means connecting the other end of said lever with the steering mechanism to cause the lever to be pivotally actuated with the operation of the steering mechanism to cause said lever to project one of said auxiliary fenders in the direction of steering of the vehicle independently of the other auxiliary fender.

In testimony whereof I have hereunto subscribed my name.

GUIDO LOLLI.